United States Patent
Takeda et al.

(10) Patent No.: US 11,432,250 B2
(45) Date of Patent: Aug. 30, 2022

(54) TRANSMISSION POWER CONTROL

(71) Applicant: QUALCOMM Incorporated, San Diego, CA (US)

(72) Inventors: Kazuki Takeda, Tokyo (JP); Seyedkianoush Hosseini, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 33 days.

(21) Appl. No.: 16/880,471

(22) Filed: May 21, 2020

(65) Prior Publication Data

US 2020/0413352 A1    Dec. 31, 2020

Related U.S. Application Data

(60) Provisional application No. 62/867,810, filed on Jun. 27, 2019.

(51) Int. Cl.
*H04W 52/38* (2009.01)
*H04W 72/12* (2009.01)

(52) U.S. Cl.
CPC ....... *H04W 52/38* (2013.01); *H04W 72/1278* (2013.01)

(58) Field of Classification Search
None
See application file for complete search history.

(56) References Cited

U.S. PATENT DOCUMENTS

| | | | | |
|---|---|---|---|---|
| 10,959,193 B2 * | 3/2021 | Ouchi | ............... | H04W 52/367 |
| 11,116,026 B2 * | 9/2021 | Jang | ............... | H04W 76/15 |
| 2010/0255847 A1 * | 10/2010 | Lee | ............... | H04W 74/004 |
| | | | | 455/436 |
| 2015/0271761 A1 * | 9/2015 | Park | ............... | H04W 72/1242 |
| | | | | 370/329 |
| 2015/0304957 A1 * | 10/2015 | Noh | ............... | H04W 52/367 |
| | | | | 455/522 |
| 2015/0327243 A1 * | 11/2015 | Yin | ............... | H04L 5/001 |
| | | | | 370/329 |
| 2017/0048803 A1 * | 2/2017 | Yi | ............... | H04W 52/146 |
| 2017/0105179 A1 * | 4/2017 | Kusashima | ............... | H04W 52/16 |
| 2017/0142668 A1 * | 5/2017 | Takeda | ............... | H04W 72/0446 |
| 2017/0164408 A1 * | 6/2017 | Takeda | ............... | H04W 74/08 |
| 2017/0164410 A1 * | 6/2017 | Takeda | ............... | H04W 72/04 |

(Continued)

FOREIGN PATENT DOCUMENTS

EP    3073649 A1    9/2016

OTHER PUBLICATIONS

International Search Report and Written Opinion—PCT/US2020/034310—ISA/EPO—dated Sep. 2, 2020.

*Primary Examiner* — Kodzovi Acolatse
(74) *Attorney, Agent, or Firm* — Harrity & Harrity, LLP

(57) ABSTRACT

Various aspects of the present disclosure generally relate to wireless communication. In some aspects, a user equipment (UE) may detect a trigger to transmit a physical random access channel (PRACH) transmission on a primary cell or primary secondary cell. The UE may determine a transmit power for the PRACH transmission based at least in part on a type of the trigger to transmit the PRACH transmission. The UE may transmit the PRACH transmission using the transmit power on the primary cell or the primary secondary cell. Numerous other aspects are provided.

30 Claims, 6 Drawing Sheets

(56) References Cited

U.S. PATENT DOCUMENTS

| | | | | |
|---|---|---|---|---|
| 2017/0188393 A1* | 6/2017 | Uchino | ................ | H04W 72/04 |
| 2017/0230843 A1* | 8/2017 | Ouchi | ................... | H04B 7/063 |
| 2017/0303212 A1* | 10/2017 | Takeda | ................. | H04W 52/36 |
| 2019/0052339 A1* | 2/2019 | Zhou | ...................... | H04B 17/17 |
| 2019/0191464 A1* | 6/2019 | Loehr | .............. | H04W 28/0278 |
| 2019/0364517 A1* | 11/2019 | Gaal | ..................... | H04W 48/18 |
| 2020/0112999 A1* | 4/2020 | Lee | .................. | H04W 74/0833 |

* cited by examiner

TRANSMISSION POWER CONTROL

CROSS-REFERENCE TO RELATED APPLICATION

This Patent Application claims priority to U.S. Patent Application No. 62/867,810, filed on Jun. 27, 2019, entitled "TRANSMISSION POWER CONTROL," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for transmission power control.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include detecting a trigger to transmit a physical random access channel (PRACH) transmission on a primary cell or primary secondary cell; determining a transmit power for the PRACH transmission based at least in part on a type of the trigger to transmit the PRACH transmission; and transmitting the PRACH transmission using the transmit power on the primary cell or the primary secondary cell.

In some aspects, a UE for wireless communication may include memory and one or more processors operatively coupled to the memory. The memory and the one or more processors may be configured to detect a trigger to transmit a PRACH transmission on a primary cell or primary secondary cell; determine a transmit power for the PRACH transmission based at least in part on a type of the trigger to transmit the PRACH transmission; and transmit the PRACH transmission using the transmit power on the primary cell or the primary secondary cell.

In some aspects, a non-transitory computer-readable medium may store one or more instructions for wireless communication. The one or more instructions, when executed by one or more processors of a UE, may cause the one or more processors to detect a trigger to transmit a PRACH transmission on a primary cell or primary secondary cell; determine a transmit power for the PRACH transmission based at least in part on a type of the trigger to transmit the PRACH transmission; and transmit the PRACH transmission using the transmit power on the primary cell or the primary secondary cell.

In some aspects, an apparatus for wireless communication may include means for detecting a trigger to transmit a PRACH transmission on a primary cell or primary secondary cell; means for determining a transmit power for the PRACH transmission based at least in part on a type of the trigger to transmit the PRACH transmission; and means for transmitting the PRACH transmission using the transmit power on the primary cell or the primary secondary cell.

In some aspects, a method of wireless communication, performed by a user equipment (UE), may include detecting a trigger to transmit a first transmission with a first transmit power, wherein the first transmission is a physical random access channel transmission on a primary cell or a primary secondary cell; altering, for a second transmission concurrent with the first transmission, a second transmit power; and transmitting at least one of the first transmission using the first transmit power on the primary cell or the primary secondary cell or the second transmission using the second transmit power.

In some aspects, a UE for wireless communication may include memory and one or more processors operatively coupled to the memory. The memory and the one or more processors may be configured to detect a trigger to transmit a first transmission with a first transmit power, wherein the first transmission is a physical random access channel transmission on a primary cell or a primary secondary cell; alter, for a second transmission concurrent with the first transmission, a second transmit power; and transmit at least one of the first transmission using the first transmit power on the primary cell or the primary secondary cell or the second transmission using the second transmit power.

In some aspects, a non-transitory computer-readable medium may store one or more instructions for wireless communication. The one or more instructions, when executed by one or more processors of a UE, may cause the one or more processors to detect a trigger to transmit a first transmission with a first transmit power, wherein the first transmission is a physical random access channel transmission on a primary cell or a primary secondary cell; alter, for a second transmission concurrent with the first transmission, a second transmit power; and transmit at least one of the first transmission using the first transmit power on the primary cell or the primary secondary cell or the second transmission using the second transmit power.

In some aspects, an apparatus for wireless communication may include means for detecting a trigger to transmit a first transmission with a first transmit power, wherein the first transmission is a physical random access channel transmission on a primary cell or a primary secondary cell; means for altering, for a second transmission concurrent with the first transmission, a second transmit power; and means for transmitting at least one of the first transmission using the first transmit power on the primary cell or the primary secondary cell or the second transmission using the second transmit power.

In some aspects, a method of wireless communication, performed by a user equipment (UE), may include detecting a trigger to transmit a physical random access channel transmission on a primary cell or primary secondary cell; delaying the physical random access channel transmission from a first physical random access channel transmission occasion where the physical random access channel transmission is to occur to a second physical random access channel transmission occasion based at least in part on a transmit power availability; and transmitting the physical random access channel transmission using the second physical random access channel transmission occasion on the primary cell or the primary secondary cell.

In some aspects, a UE for wireless communication may include memory and one or more processors operatively coupled to the memory. The memory and the one or more processors may be configured to detect a trigger to transmit a physical random access channel transmission on a primary cell or primary secondary cell; delay the physical random access channel transmission from a first physical random access channel transmission occasion where the physical random access channel transmission is to occur to a second physical random access channel transmission occasion based at least in part on a transmit power availability; and transmit the physical random access channel transmission using the second physical random access channel transmission occasion on the primary cell or the primary secondary cell.

In some aspects, a non-transitory computer-readable medium may store one or more instructions for wireless communication. The one or more instructions, when executed by one or more processors of a UE, may cause the one or more processors to detect a trigger to transmit a physical random access channel transmission on a primary cell or primary secondary cell; delay the physical random access channel transmission from a first physical random access channel transmission occasion where the physical random access channel transmission is to occur to a second physical random access channel transmission occasion based at least in part on a transmit power availability; and transmit the physical random access channel transmission using the second physical random access channel transmission occasion on the primary cell or the primary secondary cell.

In some aspects, an apparatus for wireless communication may include means for detecting a trigger to transmit a physical random access channel transmission on a primary cell or primary secondary cell; means for delaying the physical random access channel transmission from a first physical random access channel transmission occasion where the physical random access channel transmission is to occur to a second physical random access channel transmission occasion based at least in part on a transmit power availability; and means for transmitting the physical random access channel transmission using the second physical random access channel transmission occasion on the primary cell or the primary secondary cell.

Aspects generally include a method, apparatus, system, computer program product, non-transitory computer-readable medium, user equipment, base station, wireless communication device, and/or processing system as substantially described herein with reference to and as illustrated by the accompanying drawings and/or specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
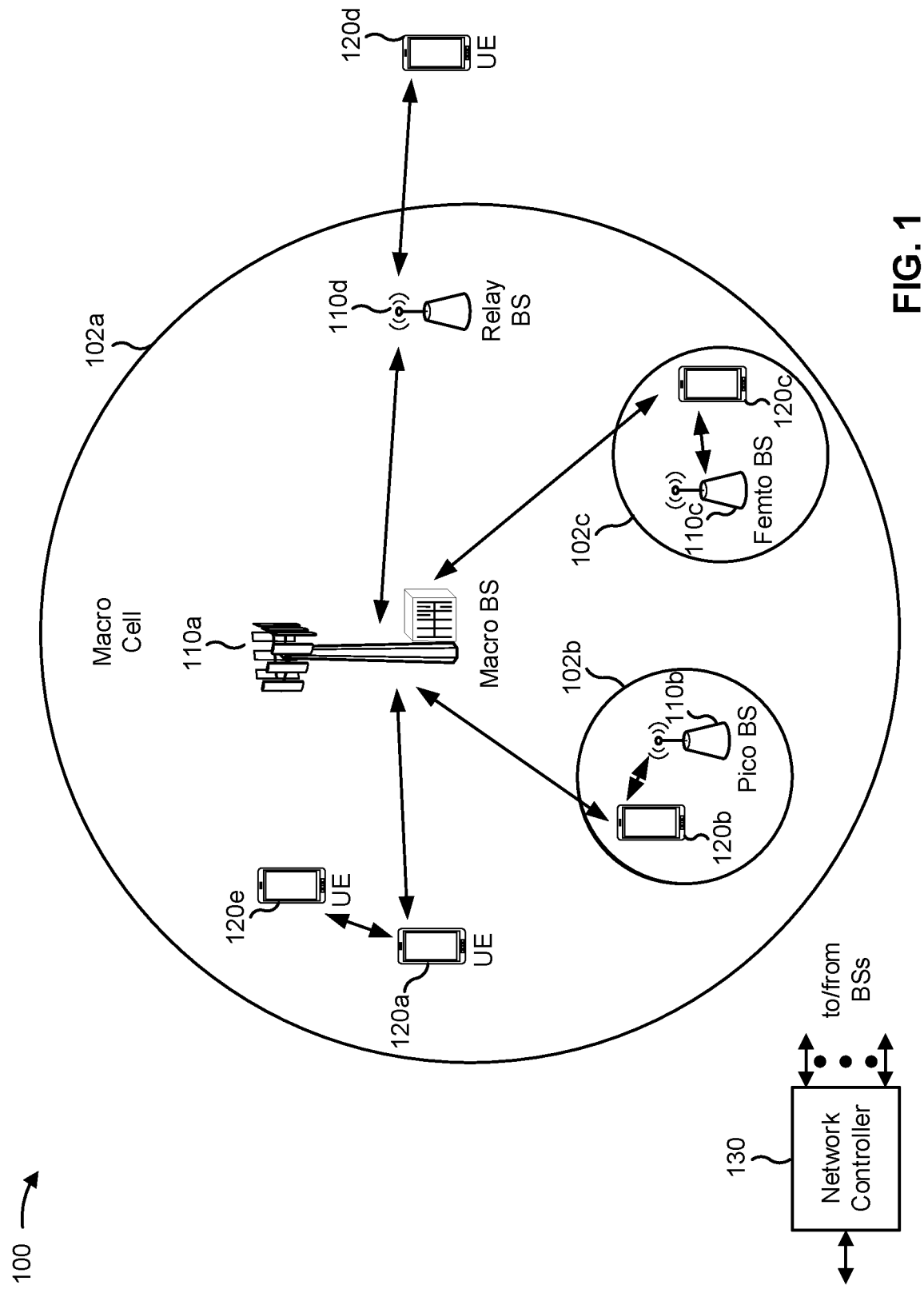
FIG. 1 is a block diagram conceptually illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. ABS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
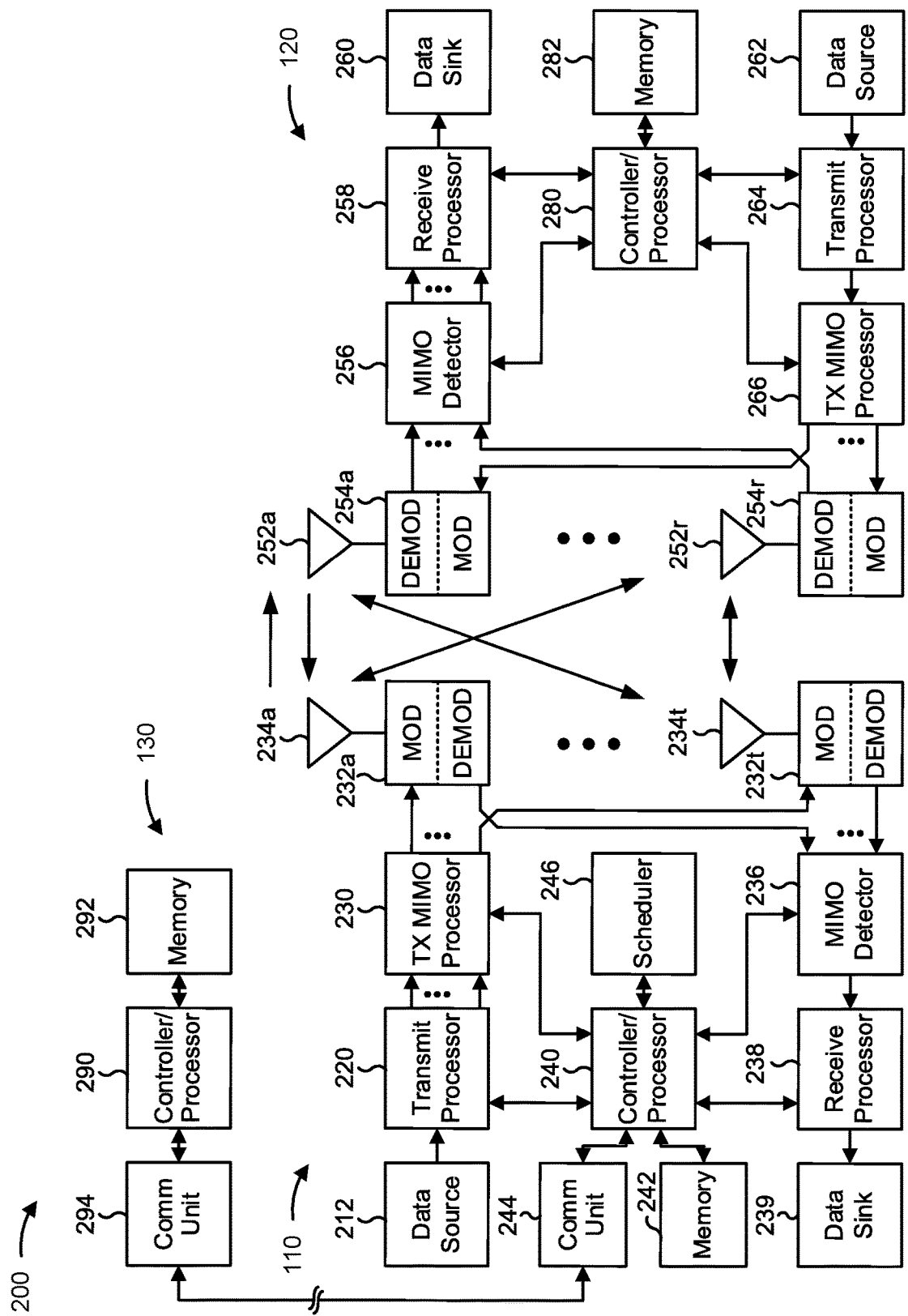
FIG. 2 is a block diagram conceptually illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234*a* through 234*t*, and UE 120 may be equipped with R antennas 252*a* through 252*r*, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232*a* through 232*t*. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232*a* through 232*t* may be transmitted via T antennas 234*a* through 234*t*, respectively. According to various aspects described in more detail below, the synchronization signals can be generated with location encoding to convey additional information.

At UE 120, antennas 252*a* through 252*r* may receive the downlink signals from base station 110 and/or other base stations and may provide received signals to demodulators (DEMODs) 254*a* through 254*r*, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254*a* through 254*r*, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254*a* through 254*r* (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with transmission power control, as described in more detail elsewhere herein. For example, controller/processor 240 of base station 110, controller/processor 280 of UE 120, and/or any other component(s) of FIG. 2 may perform or direct operations of, for example, process 400 of FIG. 4 and/or other processes as described herein. Memories 242 and 282 may store data and program codes for base station 110 and UE 120, respectively. In some aspects, memory 242 and/or memory 282 may comprise a non-transitory computer-readable medium storing one or more instructions for wireless communication. For example, the one or more instructions, when executed by one or more processors of the base station 110 and/or the UE 120, may perform or direction operations of, for example, process 400 of FIG. 4 and/or other processes as described herein. A scheduler 246 may schedule UEs for data transmission on the downlink and/or uplink.

In some aspects, UE 120 may include means for detecting a trigger to transmit a physical random access channel (PRACH) transmission on a primary cell or primary secondary cell, means for determining a transmit power for the PRACH transmission based at least in part on a type of the trigger to transmit the PRACH transmission, means for transmitting the PRACH transmission using the transmit power on the primary cell or the primary secondary cell, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

As indicated above, FIG. 2 is provided as an example. Other examples may differ from what is described with regard to FIG. 2.

In some communications systems, such as NR, a UE may operate in a dual-connectivity mode with a plurality of different access links to one or more different BSs. For example, the UE may concurrently communicate using a first frequency band for cells in a first cell group and a second frequency band for cells in a second cell group. Additionally, or alternatively, the UE may concurrently communicate with a plurality of cell groups using a single frequency band.

The UE may set a transmit power for each cell group according to an equation:

$$P_{MCG} + P_{SCG} \leq P_{Total}^{NR\text{-}NR\;DC}$$

where $P_{MCG}$ represents a maximum transmit power for a master cell group (MCG), $P_{SCG}$ represents a maximum transmit power for a secondary cell group, and $P_{TOTAL}^{NR\text{-}NR\;DC}$ represents a total maximum transmit power for dual connectivity operation. In other words, the UE may have independent maximum transmit powers for each cell group, and a sum of the independent maximum transmit powers may be less than a total maximum transmit power.

However, limiting either cell group to independent respective maximum transmit powers may result in a transmission failure for a particular transmission. For example, the UE may limit a master cell group transmission to $P_{MCG}$, which may result in transmissions for the master cell group with less than a threshold transmit power required to successfully communicate with a BS. This may occur even when secondary cell group transmissions are not at a maximum transmit power and the UE has available transmit power to allocate to master cell group transmissions. Similarly, when the UE is not using a maximum available transmit power for a master cell group, transmit power may be available for allocation to the secondary cell group (i.e., power above $P_{SCG}$), but the UE may not allocate the available transmit power so as to avoid exceeding $P_{SCG}$. This may result in a stable and/or predictable power control procedure for the UE and the BS, but may result in transmission failures for some transmissions.

Furthermore, the UE may prioritize various transmissions over other transmissions for transmit power allocation. For example, when prioritizing transmissions for transmit power allocations, the UE may prioritize a primary cell PRACH transmission over a primary secondary cell PRACH transmission, a secondary cell PRACH transmission, and/or the like. However, in a dual-connectivity mode, a reliability requirement for primary secondary cell PRACH transmissions or secondary cell PRACH transmissions may be greater than that of a primary cell PRACH transmission or another type of primary cell transmission.

Some aspects described herein enable transmission power control for transmissions in a dual-connectivity mode. For example, a UE may determine a type of trigger for a particular transmission, such as a PRACH transmission, and may adjust transmit powers and related prioritizations based at least in part on the type of the trigger. For example, a UE may provide, for a radio link failure (RLF)-triggered PRACH transmission on a primary cell, or a secondary RLF (S-RLF)-triggered PRACH transmission on a primary secondary cell, a preferential transmit power allocation relative to other types of transmissions. In this case, the UE may enable communication between a media access control (MAC) layer of the UE at which a PRACH transmission is triggered and a physical (PHY) layer of the UE at which the transmit power is determined, thereby enabling transmission power control. In this way, the UE may increase a reliability of PRACH transmissions by improved transmission power control, thereby improving network performance.

Figure 3:
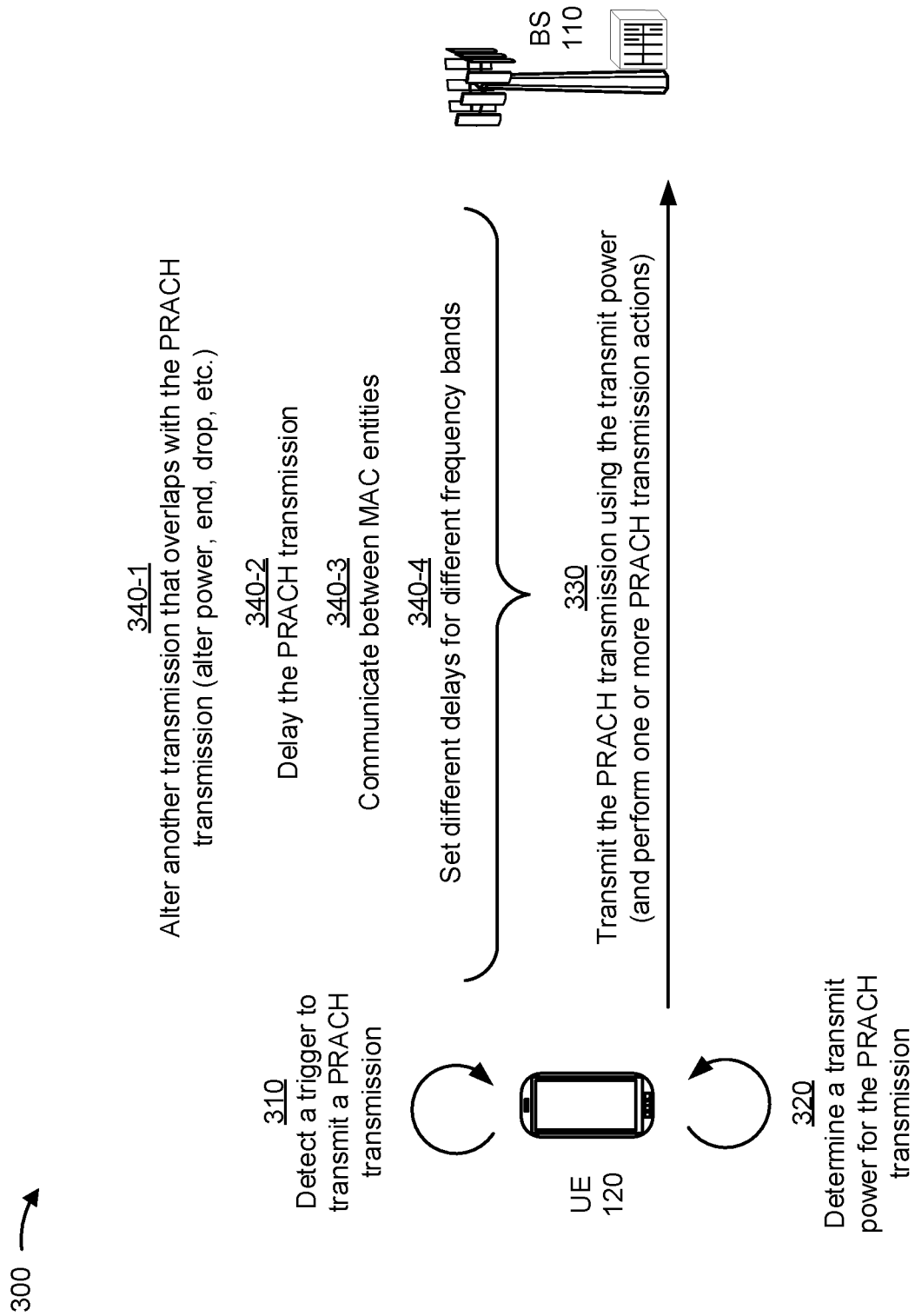
FIG. 3 is a diagram illustrating an example of transmission power control, in accordance with various aspects of the present disclosure.

FIG. 3 is a diagram illustrating an example 300 of transmission power control, in accordance with various aspects of the present disclosure. As shown in FIG. 3, example 300 includes a BS 110 and a UE 120.

As further shown in FIG. 3, and by reference number 310, UE 120 may detect a trigger to transmit a PRACH transmission. For example, UE 120 may detect an RLF on a primary cell or an S-RLF on a secondary cell that triggers a PRACH transmission. In this case, UE 120 may determine to prioritize the PRACH transmission for the RLF or S-RLF over other types of transmissions. Similarly, UE 120 may detect initiation of a beam failure recovery procedure for a primary cell or a primary secondary cell that triggers a PRACH transmission, which UE 120 may determine to prioritize over other types of transmissions. Similarly, UE 120 may detect reception of a reconfiguration message (e.g., a 'reconfiguration with sync' message) for a primary cell or primary secondary cell that triggers a PRACH transmission, which UE 120 may determine to prioritize over other types of transmissions. In this case, the reconfiguration message may relate to a contention free random access procedure for a primary cell handover or to a primary secondary cell alteration (e.g., an addition of a primary secondary cell or a change to a primary secondary cell).

In some aspects, a type of triggering event for the PRACH transmission may be associated with a particular reliability criterion. For example, UE 120 may determine that a threshold reliability is to be satisfied for some PRACH transmissions (e.g., a PRACH transmission based on an RLF, after a beam failure recovery is initiated, after receiving a reconfiguration message, and/or the like). In this case, UE 120 may determine to ensure that a transmit power of the PRACH transmissions satisfies a threshold transmit power to ensure that the threshold reliability is satisfied.

In some aspects, UE 120 may enable inter-layer communication to enable a transmit power determination. For example, UE 120 may detect the trigger to transmit the PRACH transmission at a MAC layer, and may pass signaling from the MAC layer to a PHY layer to enable a transmit power determination at the PHY layer, as described below. Similarly, UE 120 may pass signaling from a first MAC entity for which the PRACH transmission is triggered to a second MAC entity to enable transmit power determination for each MAC entity, as described below. In this way, UE 120 enables the transmit power determination to be based at least in part on a type of trigger of the PRACH transmission.

As further shown in FIG. 3, and by reference number 320, UE 120 may determine a transmit power for the PRACH transmission. For example, UE 120 may determine to prioritize a PRACH transmission based at least in part on a trigger for the PRACH transmission. In this case, UE 120 may allocate a maximum transmit power (e.g., that may exceed a maximum transmit power for a particular cell group without exceeding a total maximum transmit power) for some PRACH transmissions that are triggered by some types of triggering events, as described above. For example, UE 120 may allocate the maximum level of transmit power for PRACH transmissions triggered based at least in part on an RLF, an S-RLF, a beam failure recovery procedure, a reconfiguration message, a contention free random access procedure, and/or the like, as described above.

As further shown in FIG. 3, and by reference numbers 330 and 340-1 through 340-4, UE 120 may transmit the PRACH transmission using the transmit power and may perform one or more PRACH transmission-related actions. For example, UE 120 may transmit the PRACH transmission with a transmit power that may, for example, exceed a maximum transmit power for a cell group on which the PRACH transmission is transmitted. In other words, UE 120 may transmit the PRACH transmission with a transmit power greater than $P_{MCG}$ when transmitting to the master cell group or greater than $P_{SCG}$ when transmitting to the secondary cell group.

In some aspects, to ensure that a total transmit power does not exceed a maximum transmit power threshold $P^{NR\text{-}NR\ DC}_{TOTAL}$, UE 120 may alter a transmission characteristic of, for example, another transmission (either in addition to or instead of setting a transmit power of the PRACH transmission). For example, as shown by reference number 340-1, for another transmission that is to overlap with the PRACH transmission, UE 120 may alter a transmit power of the other transmission. In this case, when the PRACH transmission is a master cell group transmission and the other transmission is a secondary cell group transmission, UE 120 may determine transmit powers as:

$$P_{PRACH} > P_{MCG}$$

$$P_{OTHER} < P_{SCG}$$

$$P_{PRACH} + P_{OTHER} \leq P^{NR\text{-}NR\ DC}_{TOTAL}$$

where $P_{PRACH}$ is the PRACH transmission transmit power and $P_{OTHER}$ is the other transmission transmit power. In this way, UE 120 prioritizes the PRACH transmission over the other transmission to ensure reliability of the PRACH transmission.

In another example, UE 120 may end the other transmission to avoid the other transmission overlapping with the PRACH transmission and to ensure that transmit power is available for the PRACH transmission. For example, UE 120 may end the other transmission before a scheduled end of the other transmission, thereby ensuring that transmit power resources are reserved for the PRACH transmission. Additionally, or alternatively, UE 120 may drop the other transmission to ensure that transmit power resources are reserved for the PRACH transmission.

In some aspects, UE 120 may delay the PRACH transmission before transmitting the PRACH transmission (either in addition to setting the transmit power of the PRACH transmission or instead of setting the transmit power of the PRACH transmission), as shown by reference number 340-2. For example, UE 120 may delay the PRACH transmission from a first transmission opportunity (e.g., a first PRACH occasion) for which the PRACH transmission is scheduled to a second, subsequent transmission opportunity (e.g., a second PRACH occasion) in which a greater amount of transmit power resources may be allocated to the PRACH transmission. In this way, UE 120 may ensure reliability of the PRACH transmission. In some aspects, for contention-based random access, when UE 120 delays the PRACH transmission, UE 120 may forgo incrementing a power ramping counter (e.g., 'PREAMBL_POWER_RAMPING_COUNTER'). In contrast, for contention-free random access, when UE 120 delays the PRACH transmission, UE 120 may increment the power ramping counter. In this case, UE 120 determines the transmit power for the PRACH transmission based at least in part on a type of the random access procedure (e.g., contention-based or contention-free). For example, for contention-based random access, UE 120 may increase a transmit power of the PRACH transmission above a maximum transmit power for the cell (e.g., $P_{MCG}$ or $P_{SCG}$), but for contention-free random access, UE 120 may limit the PRACH transmission to the maximum transmit power for the cell.

In some aspects, UE 120 may enable inter-MAC entity communication to reserve transmit power resources for the PRACH transmission, as shown by reference number 340-3. For example, when the PRACH transmission is associated with a first MAC entity of UE 120, UE 120 may cause the first MAC entity to identify the PRACH transmission to a second MAC entity of UE 120. In this case, the second MAC entity may alter another transmission (e.g., by reducing a transmit power or rescheduling the other transmission) to enable the first MAC entity to prioritize the PRACH transmission to be transmitted with a threshold transmit power.

In some aspects, UE 120 may delay the PRACH transmission from the first transmission opportunity to the second transmission opportunity to ensure adequate time for the first MAC entity and the second MAC entity to communicate to prioritize the PRACH transmission to receive a threshold transmit power. In some aspects, UE 120 may alter, relative to a default configuration, different delay periods for different frequency bands to enable the delay to prioritize the PRACH transmission, as shown by reference number 340-4. For example, UE 120 may increase a transmission preparation delay to, for example, 2 milliseconds (ms) for a first frequency band (e.g., frequency band 'FR1') and 1 ms for a second frequency band (e.g., frequency band 'FR2') from an initial setting of 0.5 ms and 0.25 ms, respectively, thereby providing a transmission delay to enable the inter-MAC entity communication.

As indicated above, FIG. 3 is provided as an example. Other examples may differ from what is described with respect to FIG. 3.

Figure 4:
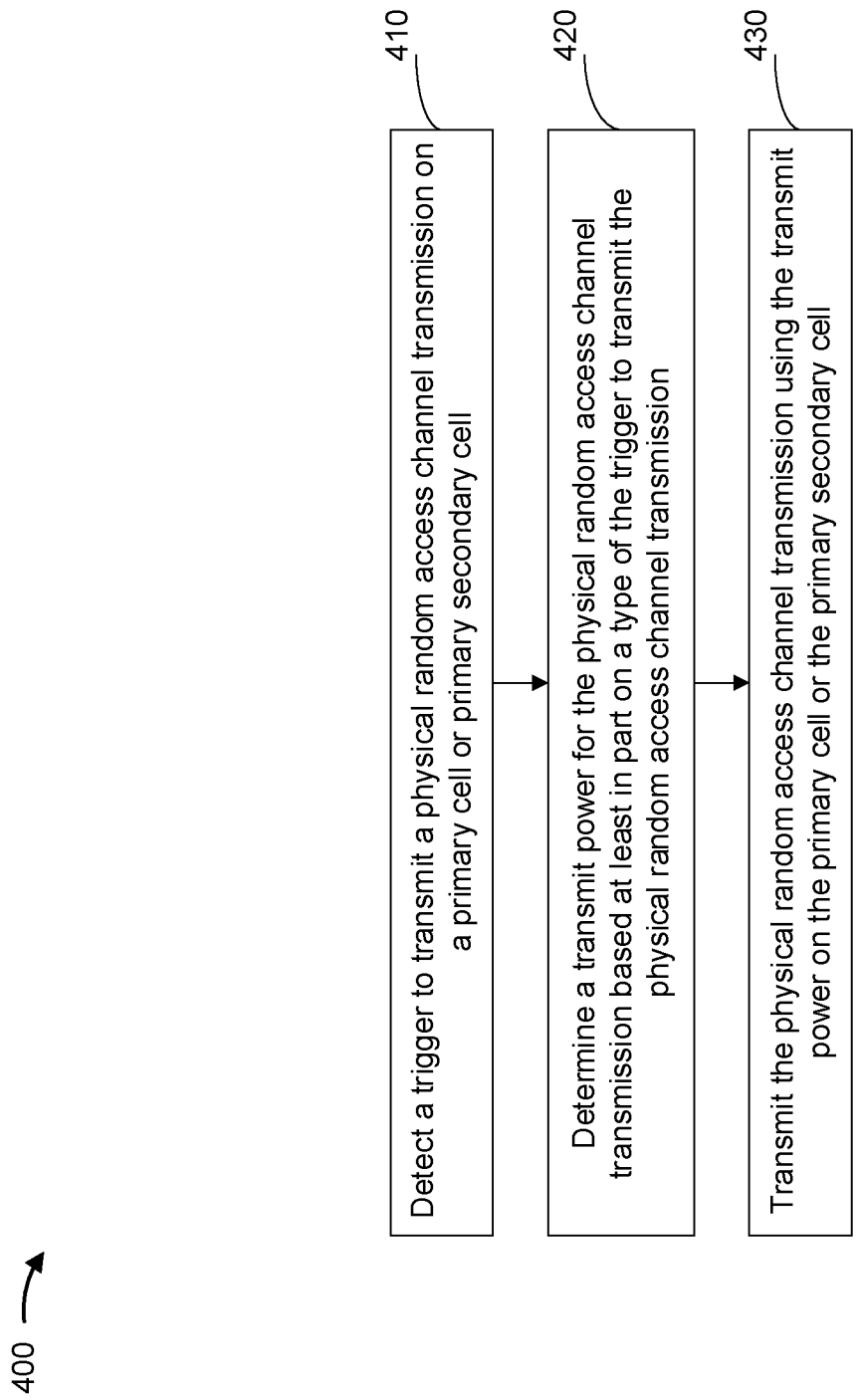
FIG. 4 is a diagram illustrating an example process performed, for example, by a user equipment, in accordance with various aspects of the present disclosure.

FIG. 4 is a diagram illustrating an example process 400 performed, for example, by a UE, in accordance with various aspects of the present disclosure. Example process 400 is an example where a UE (e.g., UE 120 and/or the like) performs operations associated with transmission power control.

As shown in FIG. 4, in some aspects, process 400 may include detecting a trigger to transmit a physical random access channel (PRACH) transmission on a primary cell or primary secondary cell (block 410). For example, the UE (e.g., using receive processor 258, transmit processor 264, controller/processor 280, memory 282, and/or the like) may detect a trigger to transmit a PRACH transmission on a primary cell or primary secondary cell, as described above with regard to FIG. 3.

In some aspects, the trigger is at least one of a radio link failure, a secondary radio link failure, a beam failure recovery, a received reconfiguration message, or a handover procedure. In some aspects, process 400 includes determining the type of the trigger at a media access control layer, and providing information identifying the type of the trigger to a physical layer to determine the transmit power.

As further shown in FIG. 4, in some aspects, process 400 may include determining a transmit power for the PRACH transmission based at least in part on a type of the trigger to transmit the PRACH transmission (block 420). For example, the UE (e.g., using receive processor 258, transmit processor 264, controller/processor 280, memory 282, and/or the like) may determine a transmit power for the PRACH transmission based at least in part on a type of the trigger to transmit the PRACH transmission, as described above with regard to FIG. 3.

In some aspects, process 400 may include determining a type of random access procedure associated with the PRACH transmission, and determining the transmit power may include determining the transmit power based at least in part on the type of the random access procedure. In some aspects, the random access procedure is a contention-based random access procedure or a contention-free random access procedure.

In some aspects, process 400 includes altering, for another transmission concurrent with the PRACH transmission, another transmit power, and transmitting the other transmission with the other transmit power. In some aspects, altering the other transmit power includes altering the other transmit power concurrent with transmitting the other transmission. In some aspects, process 400 includes determining that another transmission is to occur concurrent with the PRACH transmission, and ending the other transmission before the start of the PRACH transmission. In some aspects, process 400 includes determining that another transmission is to occur concurrent with the PRACH transmission, and dropping the other transmission.

In some aspects, process 400 includes delaying the PRACH transmission from a first PRACH transmission occasion where the PRACH transmission is to occur to a second PRACH transmission occasion based at least in part on a transmit power availability, and transmitting the PRACH transmission in the second PRACH transmission occasion. In some aspects, process 400 includes providing, from a first media access control entity associated with the PRACH transmission to a second media access control entity, information indicating that the PRACH transmission is to be scheduled, and scheduling the second media access control entity to accommodate scheduling the PRACH transmission on the first media access control entity. In some aspects, process 400 includes setting a first transmission delay for a first frequency band, and a second transmission delay, that is different from the first transmission delay, for a second frequency band to accommodate the transmit power of the PRACH transmission.

As further shown in FIG. 4, in some aspects, process 400 may include transmitting the PRACH transmission using the transmit power on the primary cell or the primary secondary cell (block 430). For example, the UE (e.g., using receive processor 258, transmit processor 264, controller/processor 280, memory 282, and/or the like) may transmit the PRACH transmission using the transmit power on the primary cell or the primary secondary cell, as described above with regard to FIG. 3.

Process 400 may include additional aspects, such as any single aspect or any combination of aspects described herein and/or in connection with one or more other processes described elsewhere herein.

Although FIG. 4 shows example blocks of process 400, in some aspects, process 400 may include additional blocks, fewer blocks, different blocks, or differently arranged blocks than those depicted in FIG. 4. Additionally, or alternatively, two or more of the blocks of process 400 may be performed in parallel.

Figure 5:
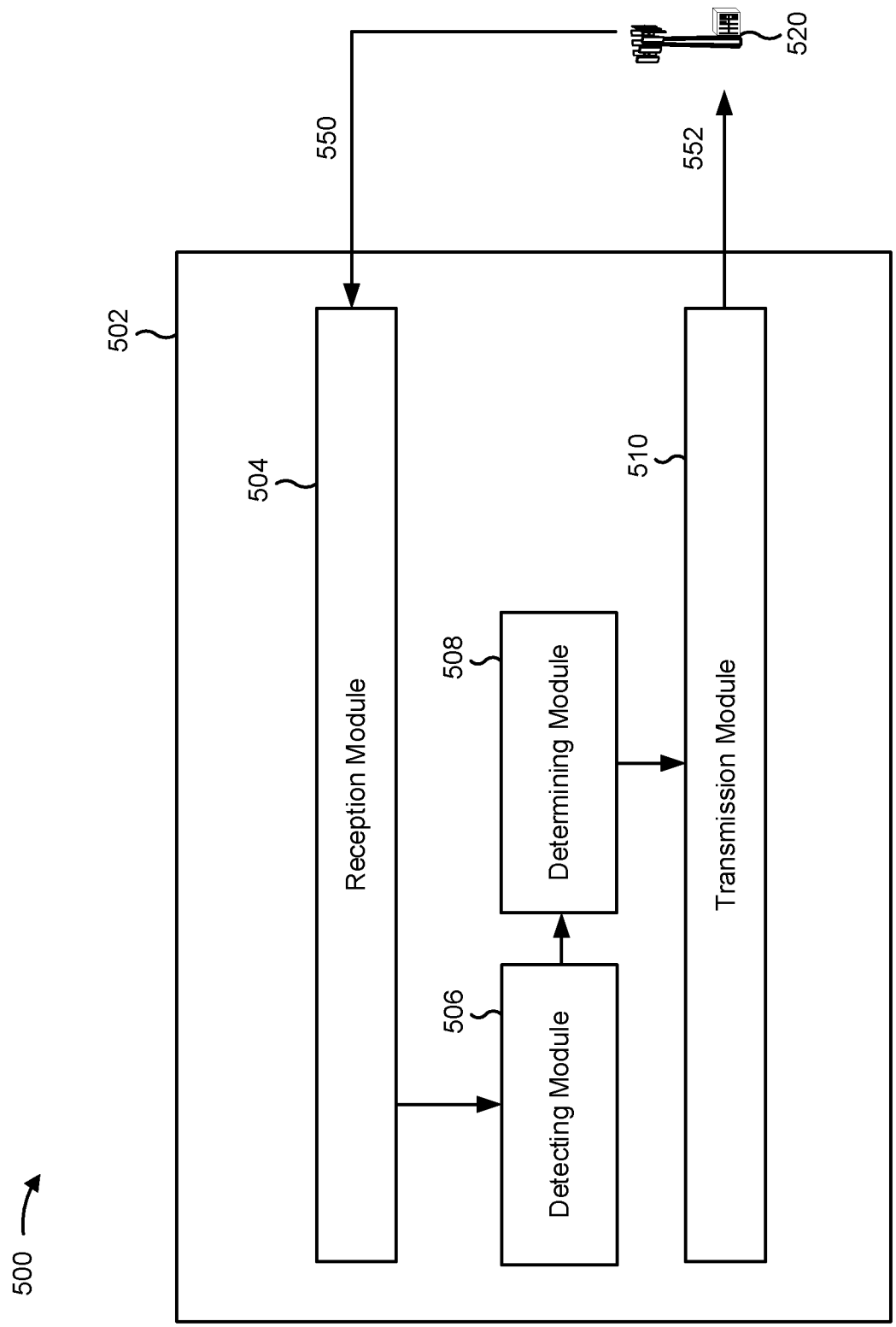
FIG. 5 is a conceptual data flow diagram illustrating an example of a data flow between different modules/means/components in an example apparatus.

FIG. 5 is a conceptual data flow diagram illustrating an example 500 of a data flow between different modules/means/components in an example apparatus 502. The apparatus 502 may include, for example, a UE (e.g., UE 120). In some aspects, the apparatus 502 includes a reception module 504, a detecting module 506, a determining module 508, and/or a transmission module 510.

In some aspects, reception module 504 may receive data 550 from BS 520. For example, reception module 504 may receive information associated with triggering an RLF, an S-RLF, a beam failure recovery, a reconfiguration, and/or the like.

In some aspects, detecting module 506 may be associated with detecting a trigger to transmit a PRACH transmission, as described above in connection with FIGS. 3 and 4. For example, detecting module 506 may receive information from reception module 504 indicating an occurrence of an RLF, an S-RLF, a beam failure, a received reconfiguration message, and/or the like. In some aspects, detecting module 506 may provide an indication of a type of trigger of the PRACH transmission to determining module 508 to enable determining module 508 to determine a transmit power for the PRACH transmission based at least in part on the type of trigger.

In some aspects, determining module 508 may be associated with determining a transmit power for a PRACH transmission, as described above in connection with FIGS. 3 and 4. For example, determining module 508 may receive an indication of a type of trigger of the PRACH transmission from detecting module 506, and may determine a transmit power for the PRACH transmission based at least in part on the type of trigger. In this case, determining module 508 controls transmission module 510 to control the transmit power of the PRACH transmission, of another transmission, and/or the like.

In some aspects, transmission module 510 may be associated with transmitting data 552 to BS 520. For example, transmission module 510 may transmit a PRACH transmission with a transmit power determined based at least in part on a trigger of the PRACH transmission, as described above in connection with FIGS. 3 and 4.

In some aspects, apparatus 502 may include additional modules that perform each of the blocks of the algorithm in the aforementioned flowchart of FIG. 4. Each block in the aforementioned flow charts of FIG. 4 may be performed by a module, and apparatus 502 may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

The number and arrangement of modules shown in FIG. 5 are provided as an example. In practice, there may be additional modules, fewer modules, different modules, or differently arranged modules than those shown in FIG. 5. Furthermore, two or more modules shown in FIG. 5 may be implemented within a single module, or a single module shown in FIG. 5 may be implemented as multiple, distributed modules. Additionally, or alternatively, a set of modules (e.g., one or more modules) shown in FIG. 5 may perform one or more functions described as being performed by another set of modules shown in FIG. 5.

Figure 6:
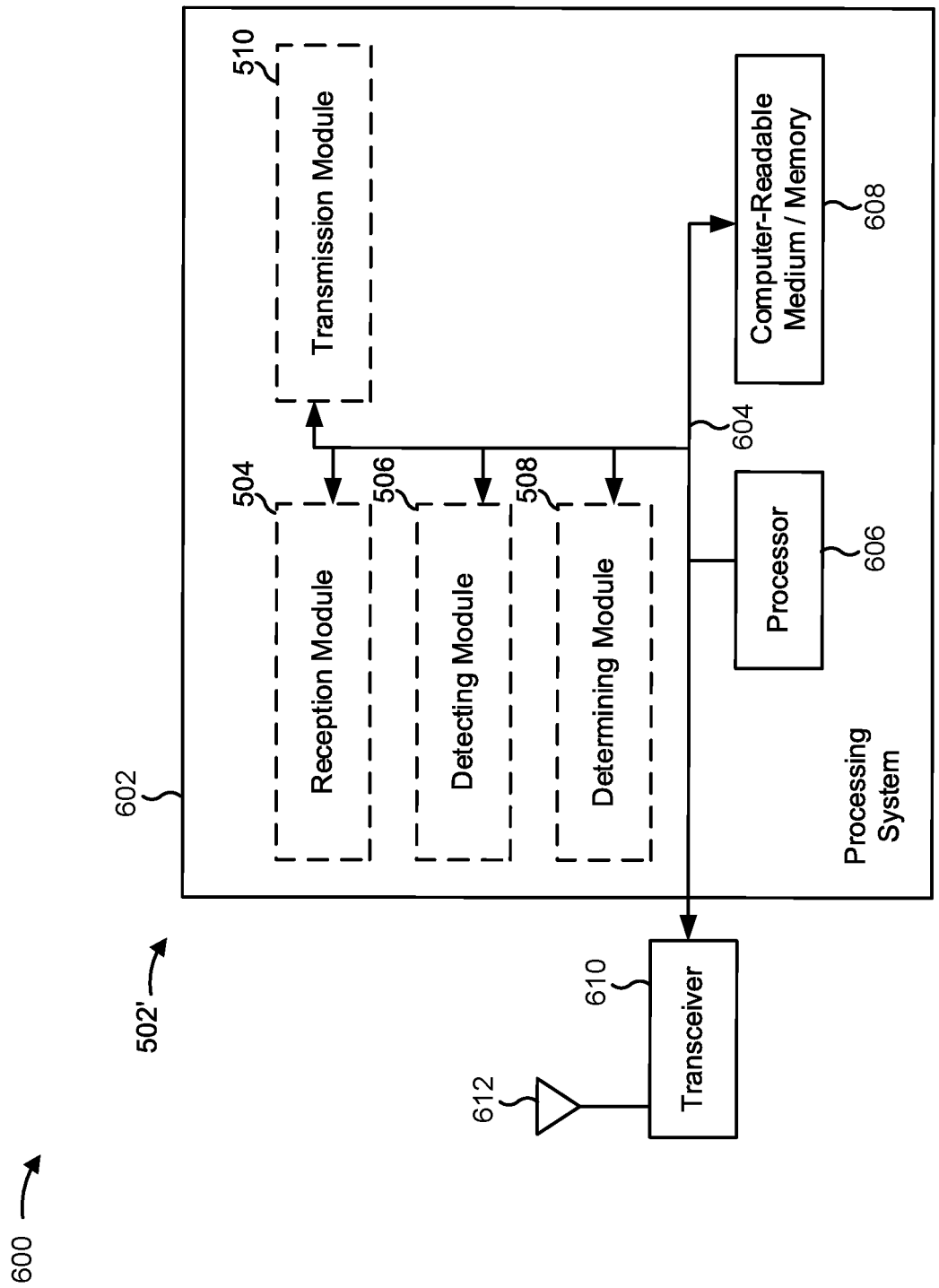
FIG. 6 is a diagram illustrating an example of a hardware implementation for an apparatus employing a processing system.

FIG. 6 is a diagram illustrating an example 600 of a hardware implementation for an apparatus 502' (e.g., apparatus 502 described above in connection with FIG. 5) employing a processing system 602. The apparatus 502' may include, for example, a UE (e.g., UE 120).

The processing system 602 may be implemented with a bus architecture, represented generally by the bus 604. The bus 604 may include any number of interconnecting buses and bridges depending on the specific application of the processing system 602 and the overall design constraints. The bus 604 links together various circuits including one or more processors and/or hardware modules, represented by the processor 606, the modules 504, 506, 508, and/or 510, and the computer-readable medium/memory 608. The bus 604 may also link various other circuits such as timing sources, peripherals, voltage regulators, and power management circuits, which are well known in the art, and therefore will not be described any further.

The processing system 602 may be coupled to a transceiver 610. The transceiver 610 is coupled to one or more antennas 612. The transceiver 610 provides a means for communicating with various other apparatuses over a transmission medium. The transceiver 610 receives a signal from the one or more antennas 612, extracts information from the received signal, and provides the extracted information to the processing system 602. In addition, the transceiver 610 receives information from the processing system 602 and, based at least in part on the received information, generates a signal to be applied to the one or more antennas 612.

The processing system 602 includes a processor 606 coupled to a computer-readable medium/memory 608. The processor 606 is responsible for general processing, including the execution of software stored on the computer-readable medium/memory 608. The software, when executed by the processor 606, causes the processing system 602 to perform the various functions described above for any particular apparatus. The computer-readable medium/memory 608 may also be used for storing data that is manipulated by the processor 606 when executing software. The processing system further includes at least one of the modules 504, 506, 508, and/or 510. The modules may be software modules running in the processor 606, resident/stored in the computer readable medium/memory 608, one or more hardware modules coupled to the processor 606, or some combination thereof.

In some aspects, the apparatus 502 for wireless communication includes means for detecting a trigger to transmit a PRACH transmission on a primary cell or primary secondary cell, means for determining a transmit power for the PRACH transmission based at least in part on a type of the trigger to transmit the PRACH transmission, means for transmitting the PRACH transmission using the transmit power on the primary cell or the primary secondary cell, means for determining the type of the trigger at a media access control layer, means for providing information identifying the type of the trigger to a physical layer to determine the transmit power, means for altering, for another transmission concurrent with the PRACH transmission, another transmit power, means for transmitting the other transmission with the other transmit power, means for altering the other transmit power concurrent with transmitting the other transmission, means for determining that another transmission is to occur concurrent with the PRACH transmission, means for ending the other transmission before the start of the PRACH transmission, means for determining that another transmission is to occur concurrent with the PRACH transmission, means for dropping the other transmission, means for delaying the PRACH transmission from a first PRACH transmission occasion where the PRACH transmission is to occur to a second PRACH transmission occasion based at least in part on a transmit power availability, means for transmitting the PRACH transmission in the second PRACH transmission occasion, means for providing, from a first media access control entity associated with the PRACH transmission to a second media access control entity, information indicating that the PRACH transmission is to be scheduled, means for scheduling the second media access control entity to accommodate scheduling the PRACH transmission on the first media access control entity, means for setting a first transmission delay for a first frequency band and a second transmission delay, that is different from the first transmission delay, for a second frequency band to accommodate the transmit power of the PRACH transmission, and/or the like. The aforementioned means may be one or more of the aforementioned modules of the apparatus 502 and/or the processing system 602 of the apparatus 502 configured to perform the functions recited by the aforementioned means.

As indicated above, FIG. 6 is provided as an example. Other examples may differ from what is described with regard to FIG. 6.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
   detecting, at a media access control layer of the UE, a trigger to transmit a physical random access channel transmission on a primary cell or a primary secondary cell;
   signaling, by the media access control layer to a physical layer of the UE, detection of the trigger;
   allocating, by the physical layer, a transmit power, for the physical random access channel transmission and exceeding a maximum transmit power associated with a first cell group including the primary cell or the primary secondary cell, based at least in part on a type of the trigger and a total maximum transmit power, wherein the maximum transmit power is associated with the first cell group and another cell group; and
   transmitting the physical random access channel transmission using the transmit power on the primary cell or the primary secondary cell.

2. The method of claim 1, wherein the trigger is at least one of:
   a radio link failure,
   a secondary radio link failure,
   a beam failure recovery,
   a received reconfiguration message, or
   a handover procedure.

3. The method of claim 1, wherein at least one of:
   the method further comprises:
      determining the type of the trigger at the media access control layer; or
   the signaling detection of the trigger comprises:
      providing information identifying the type of the trigger to the physical layer to allocate the transmit power.

4. The method of claim 1, further comprising:
   altering, for another transmission concurrent with the physical random access channel transmission, another transmit power; and
   transmitting the other transmission with the other transmit power.

5. The method of claim 4, wherein altering the other transmit power comprises:
   altering the other transmit power concurrent with transmitting the other transmission.

6. The method of claim 1, further comprising:
   determining that another transmission is to occur concurrent with the physical random access channel transmission; and
   ending the other transmission before a start of the physical random access channel transmission.

7. The method of claim 1, further comprising:
   determining that another transmission is to occur concurrent with the physical random access channel transmission; and
   dropping the other transmission.

8. The method of claim 1, further comprising:
   delaying the physical random access channel transmission from a first physical random access channel transmission occasion where the physical random access channel transmission is to occur to a second physical random access channel transmission occasion based at least in part on a transmit power availability; and
   wherein transmitting the physical random access channel transmission comprises:
      transmitting the physical random access channel transmission in the second physical random access channel transmission occasion.

9. The method of claim 1, further comprising:
   providing, from a first media access control entity associated with the physical random access channel transmission to a second media access control entity, information indicating that the physical random access channel transmission is to be scheduled; and
   scheduling the second media access control entity to accommodate scheduling the physical random access channel transmission on the first media access control entity.

10. The method of claim 1, further comprising:
    setting a first transmission delay for a first frequency band and a second transmission delay, that is different from the first transmission delay, for a second frequency band to accommodate the transmit power of the physical random access channel transmission.

11. The method of claim 1, further comprising:
    determining a type of random access procedure associated with the physical random access channel transmission; and
    wherein allocating the transmit power comprises:
       allocating the transmit power based at least in part on the type of the random access procedure.

12. The method of claim 11, wherein the random access procedure is a contention-based random access procedure or a contention-free random access procedure.

13. A user equipment (UE) for wireless communication, comprising:
    a memory; and
    one or more processors coupled to the memory, the one or more processors configured to:
       detect, at a media access control layer of the UE, a trigger to transmit a physical random access channel transmission on a primary cell or a primary secondary cell;

signal, by the media access control layer to a physical layer of the UE, detection of the trigger;
allocate, by the physical layer, a transmit power, for the physical random access channel transmission and exceeding a maximum transmit power associated with a first cell group including the primary cell or the primary secondary cell, based at least in part on a type of the trigger, to transmit the physical random access channel transmission, and a total maximum transmit power associated with the first cell group and another cell group; and
transmit the physical random access channel transmission using the transmit power on the primary cell or the primary secondary cell.

14. The UE of claim 13, wherein the trigger is at least one of:
a radio link failure,
a secondary radio link failure,
a beam failure recovery,
a received reconfiguration message, or
a handover procedure.

15. The UE of claim 13, wherein at least one of:
the one or more processors are further configured to:
determine the type of the trigger at the media access control layer, or to signal detection of the trigger, the one or more processors are configured to:
provide information identifying the type of the trigger to the physical layer to allocate the transmit power.

16. The UE of claim 13, wherein the one or more processors are further configured to:
alter, for another transmission concurrent with the physical random access channel transmission, another transmit power; and
transmit the other transmission with the other transmit power.

17. The UE of claim 16, wherein the one or more processors, to alter the other transmit power, are to:
alter the other transmit power concurrent with transmitting the other transmission.

18. The UE of claim 13, wherein the one or more processors are further configured to:
determine that another transmission is to occur concurrent with the physical random access channel transmission; and
end the other transmission before a start of the physical random access channel transmission.

19. The UE of claim 13, wherein the one or more processors are further configured to:
determine that another transmission is to occur concurrent with the physical random access channel transmission; and
drop the other transmission.

20. The UE of claim 13, wherein the one or more processors are further configured to:
delay the physical random access channel transmission from a first physical random access channel transmission occasion where the physical random access channel transmission is to occur to a second physical random access channel transmission occasion based at least in part on a transmit power availability; and
wherein the one or more processors, to transmit the physical random access channel transmission, are to:
transmit the physical random access channel transmission in the second physical random access channel transmission occasion.

21. The UE of claim 13, wherein the one or more processors are further configured to:

provide, from a first media access control entity associated with the physical random access channel transmission to a second media access control entity, information indicating that the physical random access channel transmission is to be scheduled; and
schedule the second media access control entity to accommodate scheduling the physical random access channel transmission on the first media access control entity.

22. A method of wireless communication performed by a user equipment (UE), comprising:
detecting, at a media access control layer of the UE, a trigger to transmit a first transmission with a first transmit power, wherein the first transmission is a physical random access channel transmission on a primary cell or a primary secondary cell;
signaling, by the media access control layer to a physical layer of the UE, detection of the trigger;
altering, for a second transmission concurrent with the first transmission and based at least in part on allocating, by the physical layer, the first transmit power, exceeding a maximum transmit power, associated with a first cell group including the primary cell or the primary secondary cell, based at least on a total maximum transmit power associated with the cell group and another cell group, a second transmit power; and
transmitting at least one of the first transmission using the first transmit power on the primary cell or the primary secondary cell or the second transmission using the second transmit power.

23. The method of claim 22, further comprising:
allocating the first transmit power for the first transmission based at least in part on a type of the trigger and the total maximum transmit power.

24. The method of claim 22, wherein altering the second transmit power comprises:
altering the second transmit power concurrent with transmitting the second transmission.

25. The method of claim 22, further comprising:
determining that the second transmission is to occur concurrent with the first transmission; and
ending the second transmission before a start of the first transmission.

26. The method of claim 22, further comprising:
determining that the second transmission is to occur concurrent with the first transmission; and
dropping the second transmission.

27. A method of wireless communication performed by a user equipment (UE), comprising:
detecting, at a media access control layer of the UE, a trigger to transmit a physical random access channel transmission on a primary cell or primary secondary cell;
signaling, by the media access control layer to a physical layer of the UE, detection of the trigger;
allocating, by the physical layer, a transmit power, associated with the physical random access channel transmission, exceeding a maximum transmit power associated with a first cell group including the primary cell or the primary secondary cell;
delaying the physical random access channel transmission from a first physical random access channel transmission occasion where the physical random access channel transmission is to occur to a second physical random access channel transmission occasion based at least in part on:
the transmit power, associated with the physical random access channel transmission, exceeding the maximum transmit power associated with a first cell group including the primary cell or the primary secondary cell, and a first transmit power availability, associated with the first physical random access channel transmission occasion, being less than a second transmit power availability associated with the second physical random access channel transmission occasion; and transmitting the physical random access channel transmission using the second physical random access channel transmission occasion on the primary cell or the primary secondary cell.

28. The method of claim 27, wherein allocating the transmit power comprises:

allocating the transmit power for the physical random access channel transmission based at least in part on a type of the trigger and a total maximum transmit power, wherein the total maximum transmit power is associated with the first cell group and another cell group.

29. The method of claim 27, further comprising:

providing, from a first media access control entity associated with the physical random access channel transmission to a second media access control entity, information indicating that the physical random access channel transmission is to be scheduled; and scheduling the second media access control entity to accommodate scheduling the physical random access channel transmission on the first media access control entity.

30. The method of claim 27, further comprising:

setting a first transmission delay for a first frequency band and a second transmission delay, that is different from the first transmission delay, for a second frequency band to accommodate the transmit power of the physical random access channel transmission.

* * * * *